United States Patent
Cesnak et al.

(10) Patent No.: US 8,310,851 B2
(45) Date of Patent: Nov. 13, 2012

(54) METHOD FOR OPERATING AN INVERTER HAVING A STEP-UP DEVICE CONNECTED UPSTREAM

(75) Inventors: Lorand Cesnak, Weikendorf (AT); Harald Kernstock, Vienna (AT); Markus Kogard, Hagenbrunn (AT)

(73) Assignee: Siemens Aktiengesellschaft, München (DE)

( * ) Notice: Subject to any disclaimer, the term of this patent is extended or adjusted under 35 U.S.C. 154(b) by 954 days.

(21) Appl. No.: 11/918,808

(22) PCT Filed: Jan. 30, 2006

(86) PCT No.: PCT/EP2006/050513
§ 371 (c)(1),
(2), (4) Date: Feb. 4, 2009

(87) PCT Pub. No.: WO2006/111428
PCT Pub. Date: Oct. 26, 2006

(65) Prior Publication Data
US 2009/0212750 A1    Aug. 27, 2009

(30) Foreign Application Priority Data
Apr. 21, 2005    (DE) .......................... 10 2005 018 596

(51) Int. Cl.
*H02M 7/44* (2006.01)

(52) U.S. Cl. ............... 363/95; 363/65; 363/79; 363/131
(58) Field of Classification Search .................. 323/271; 363/37, 65, 79, 95, 97, 131
See application file for complete search history.

(56) References Cited

U.S. PATENT DOCUMENTS

| | | | | |
|---|---|---|---|---|
| 6,058,035 A | * | 5/2000 | Madenokouji et al. | 363/95 |
| 6,486,644 B1 | * | 11/2002 | Nemirow | 323/285 |
| 7,193,872 B2 | * | 3/2007 | Siri | 363/95 |
| 7,355,869 B2 | * | 4/2008 | Okamura | 363/132 |
| 2003/0218895 A1 | * | 11/2003 | Liu | 363/79 |
| 2004/0151011 A1 | | 8/2004 | Toyomura et al. | |
| 2004/0165408 A1 | | 8/2004 | West et al. | |
| 2004/0207366 A1 | | 10/2004 | Sung | |
| 2005/0180175 A1 | * | 8/2005 | Torrey et al. | 363/17 |
| 2006/0035116 A1 | * | 2/2006 | Kanouda et al. | 429/9 |

FOREIGN PATENT DOCUMENTS

| | | |
|---|---|---|
| DE | 19937410 A1 | 2/2001 |
| DE | 10109151 A1 | 9/2002 |
| EP | 0 947 904 A2 | 10/1999 |
| JP | 02 211055 A | 8/1990 |
| WO | 03044939 A1 | 5/2003 |

* cited by examiner

*Primary Examiner* — Jue Zhang
*Assistant Examiner* — Fred E Finch, III

(57) ABSTRACT

The invention relates to a method for operating an inverter comprising a step-up device which is upstream-connected by means of an intermediate circuit and is connectable to a direct-current source with a variable reference sampling current wherein said inverter and the step-up device are provided with an efficiency optimizing working area, respectively. When the variable reference sampling current is raised and the step-up device approaches a pulse duty factor value, the intermediate circuit voltage is reduced and the variable reference sampling current is stabilized, said intermediate circuit voltage is re-raised. When the direct-current source is in a permanent operational state, the inverter and the step-up device operate in the efficiency optimizing working area thereof, respectively.

2 Claims, 2 Drawing Sheets

METHOD FOR OPERATING AN INVERTER HAVING A STEP-UP DEVICE CONNECTED UPSTREAM

CROSS REFERENCE TO RELATED APPLICATIONS

This application is the U.S. National Stage of International Application No. PCT/EP2006/050513, filed Jan. 30, 2006 and claims the benefit thereof. The International Application claims the benefits of German application No. 10 2005 018 596.7 filed Apr. 21, 2005, both of the applications are incorporated by reference herein in their entirety.

FIELD OF INVENTION

The invention relates to a method for operating an inverter having a step-up device, connected upstream via a direct current link, that can be connected to a direct current source having a varying specified draw current, with the inverter and step-up device each having their own efficiency-optimized operating range. The invention relates further to an arrangement for implementing the method.

BACKGROUND OF THE INVENTION

Methods that employ inverters having a step-up device connected upstream are used in applications in which low direct voltages are converted into higher alternating voltages. The step-up device therein controls the output current of the direct current source and, as a direct current link voltage, delivers a direct voltage that is converted by the inverter into an alternating voltage and delivered to a load or alternating current system. The direct current link voltage is therein controlled by the inverter.

Methods of said type are used for, for example, connecting photovoltaic cells, fuel cells, and similar direct current sources having a varying specified draw current to a load or alternating current system. What is therein to be understood as a specified draw current is the draw current specified by, for instance, an internal controller of the direct current source for tapping the energy made available by the direct current source. Direct current sources of said type generally have a current-dependent characteristic voltage curve. External influencing factors, for example changing light conditions in the case of photovoltaic cells, can cause the draw current to vary. Dynamic operating conditions of said kind need to be taken onto account in the way the inverter and step-up device are controlled. According to the prior art there are various typologies therefor, examples of which can be found in U.S. 2004/0207366 and U.S. 2004/0165408. The direct current link voltage is therein maintained at a virtually constant value. The maximum permissible output voltage of the direct current source is decisive in determining said value because the maximum pulse duty factor of the step-up device is not allowed to be reached up to and including said value. The step-up device's current controller will otherwise no longer be able to control the draw current, or the current will be decreased owing to the voltage.

Specifying the constant direct current link voltage has disadvantages for the overall efficiency of the unit consisting of step-up device and inverter. The step-up device works most efficiently when operating with the maximum pulse duty factor. However, the pulse duty factor is significantly below the maximum when the direct current source is in its stationary operating condition because sufficient room still has to be provided for dynamic increases in draw current.

SUMMARY OF INVENTION

The object of the invention is therefore to disclose what compared with the prior art is an improved method for operating an inverter having a step-up device connected upstream.

Said object is inventively achieved by means of a method having the features of the claims. The advantage thereby achieved is that both the inverter and the step-up device will work within their respective own efficiency-optimized operating range when the direct current source is in its stationary operating condition.

The invention is advantageously embodied when the input voltage of the step-up device times its transformation ratio minus a safety value of around 30% of the inverter's mean input-voltage range value is specified as being the optimum direct current link voltage and when the uppermost and lowermost input-voltage range value of the inverter (W) are specified respectively as being the upper limiting value of the direct current link voltage ($U_{DCW}$) and its lower limiting value.

It is furthermore advantageous for the direct current link voltage to be decreased to around 90% of its present value if the present value of the direct current link voltage exceeds a threshold, which is in turn 90% of the upper voltage limiting value of the efficiency-optimized optimized operating range of the inverter, and the specified draw current of the direct current source exceeds 125% of the present draw current and the present draw current is approaching the maximum draw current specified as the direct voltage source's internal current limitation. What is achieved thereby is that the step-up device will despite a sharp rise in current draw retain its control dynamics and not go into the maximum pulse duty factor condition.

When, through adjusting of the step-up device, the present draw current then again corresponds to the direct current source's specified draw current, the optimum direct current link voltage at which the step-up device will operate within its efficiency-optimized range will be approached step by step. A check is therein performed after each approach step to determine whether the optimum direct current link voltage has been reached yet and whether the aforementioned conditions for again decreasing the direct current link voltage exist owing to another dynamic specified draw current.

Provided for implementing said method for controlling the direct current link voltage is an arrangement wherein the inverter can be connected at its output side to a load or alternating current system and is connected at its input side to a direct current source via a step-up device.

An advantageous embodiment of said arrangement is obtained by means of a step-up device of isolated design having, for example, a planar transformer. Step-up devices of said type are very suitable for high transformation ratios between the input and output voltage.

The method is especially suitable for connecting fuel cells, photovoltaic cells, batteries, accumulators, direct current generators, and suchlike to a load or alternating current system. The draw currents can vary widely in the case of said direct current sources and there is a clear dependency relationship between draw current and voltage. Through inventive controlling of the direct current link voltage, a high degree of efficiency is achieved for the combined step-up device/inverter unit despite said dynamic processes in the direct current source.

It is furthermore recommended integrating in the arrangement a control unit embodied for controlling the inverter and step-up device, with said control unit having a microprocessor. For example a DSP (Digital Signal Processor) is therein employed that from the present current and voltage values calculates the setpoint values for controlling the step-up device and inverter.

BRIEF DESCRIPTION OF THE DRAWINGS

The invention is explained in more detail below with the aid of exemplary figures and an exemplary embodiment.

DETAILED DESCRIPTION OF INVENTION

Figure 1:
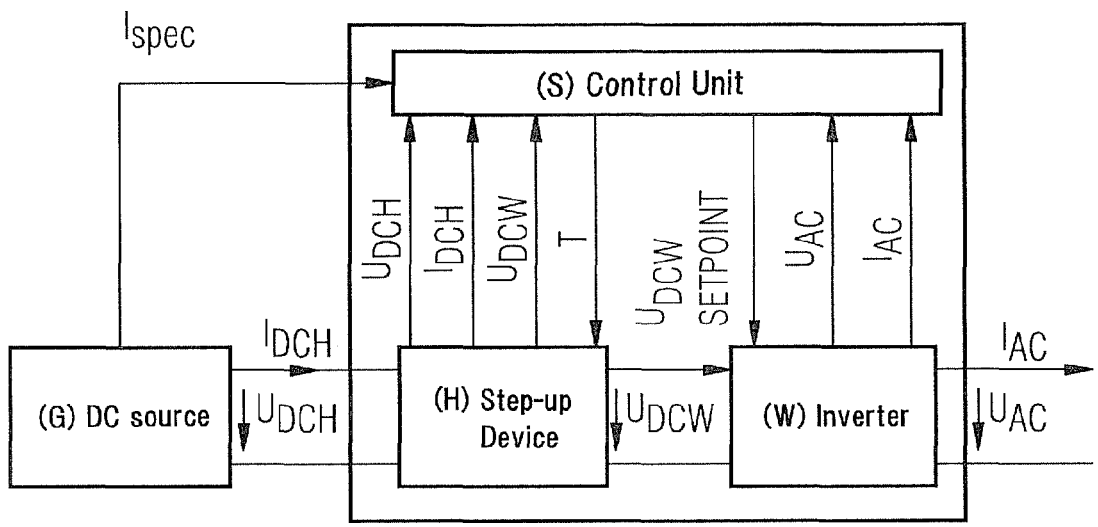
FIG. 1: is a schematic of the arrangement

Shown in FIG. 1 is the inventive arrangement of the step-up device H of the inverter W having the control unit S, and the connected direct current source G. The direct current source G is, for example, a fuel cell to whose output a direct voltage $U_{DCH}$ is applied. The step-up device H is preferably of isolated design and delivers at its output the direct current link voltage $U_{DCW}$ resulting from the voltage $U_{DCH}$ of the direct current source times the transformation ratio N (for example N32 14) of a planar transformer acting in the step-up device H.

Figure 2:
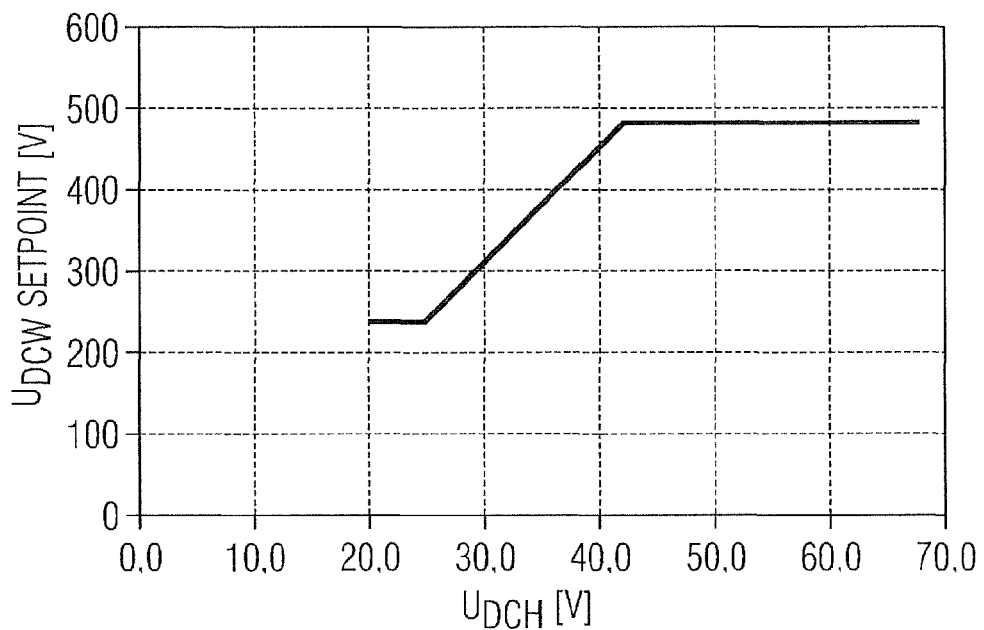
FIG. 2: shows the curve of the optimum direct current link voltage above the voltage of a direct current source G

It is specified to the inverter W on startup that the direct current link voltage $U_{DCW}$ is to be maintained by the inverter W at the upper limiting value of the efficiency-optimized operating range of the inverter W. Said value has in FIG. 2 been drawn at, by way of example 480V, as a straight line parallel to the abscissa. FIG. 2. is therein an exemplary specification of the optimum direct current link voltage $U_{DCW\_setpoint}$ above the voltage $U_{DCH}$ of a fuel cell. Up to a voltage $U_{DCH}$ of the fuel cell of around 25V, the direct current link voltage remains constant at a lower limiting value $U_{DCW\_setpoint\_min}=240V$. That is followed by a linear rise up to the upper limiting value $U_{DCW\_setpoint\_max}=480V$. The limiting values $U_{DCW\_setpoint\_min}$ and $U_{DCW\_setpoint\_max}$ therein delimit the range within which the inverter W operates in an efficiency-optimized manner and are determined by the physical design of the inverter W and by its components.

The step-up device H operates in the current-controlled mode. The voltage $U_{DCH}$ of the direct current source G drops simultaneously as the current of the step-up device H rises. The pulse duty factor T of the step-up device H consequently increases. The step-up device H partially reaches its fully-blocking mode as of a specific draw voltage $U_{DCH}$, and current controlling will no longer be insured. Said value is shown by way of example at 42V in FIG. 2.

The direct current link voltage $U_{DCW}$ will be decreased by the inverter W so that the current controller of the step-up device H can continue controlling the current. The setpoint value of the direct current link voltage $U_{DCW\_setpoint}$ will then be provided by the formula:

$$U_{DCW\_setpoint}=U_{DCH}*N-S_U, \qquad (1)$$

where N is the transformation ratio of the step-up device H and $S_U$ is a safety value in the order of, for example, around 30% of the mean input voltage range value of the inverter W. Said input voltage range value corresponds in FIG. 2 to the optimum setpoint value of the direct current link voltage $U_{DCW\_setpoint}$ and is, for example, between the limits $U_{DCW\_setpoint\_min}=240V$ and $U_{DCW\_setpoint\_max}=480V$.

The mean input voltage range value will then be 360V, so that a safety value Su of around 100V can be assumed.

The safety value $S_U$ is deducted owing to the dead time and a controlling reserve of the voltage controller of the inverter W because said voltage controller has been set as having a long time lag on account of the power pulsations on the AC side.

Figure 3:
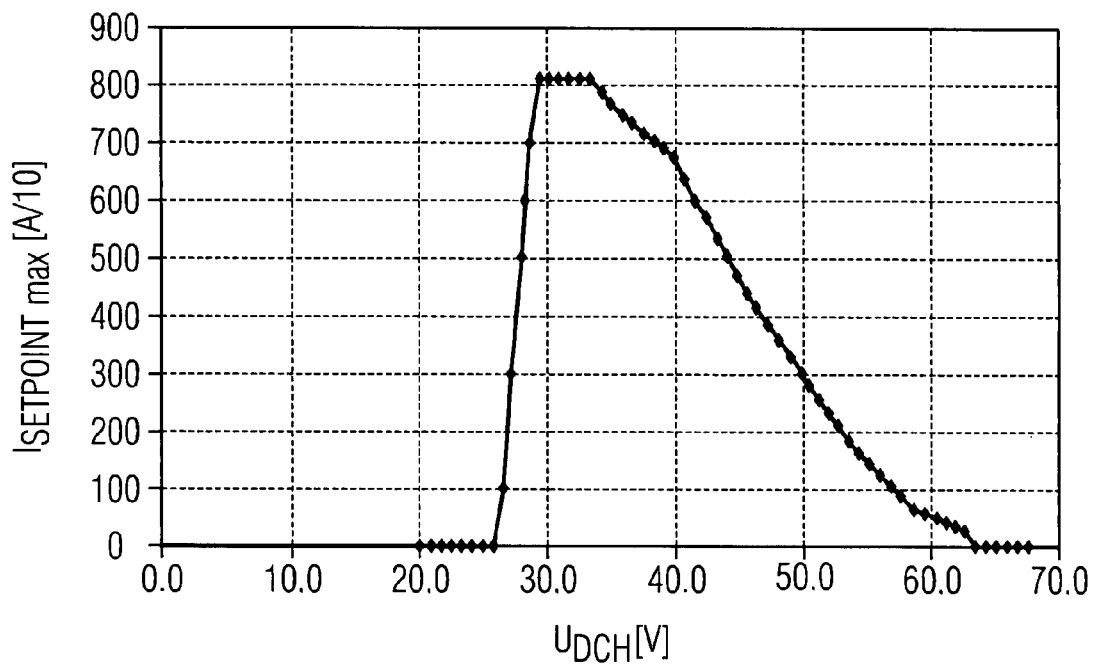
FIG. 3: shows the curve of the maximum current setpoint value $I_{setpoint\_max}$ above the voltage of a direct current source G
Figure 4:
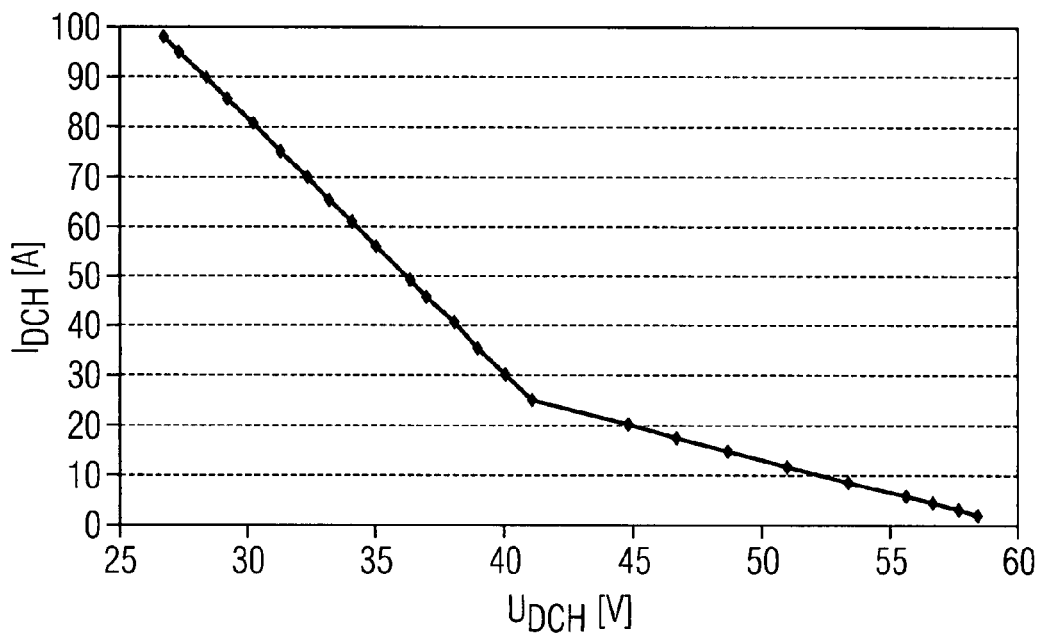
FIG. 4: shows the characteristic curve of a fuel cell simulator

A threshold $U_{DCW\_threshold}$ that is around 10% below the upper limiting value $U_{DCW\_setpoint\_max}$ (for example 430V) is specified after startup for the setpoint value of the direct current link voltage $U_{DCW\_setpoint}$. The setpoint value of the direct current link voltage $U_{DCW\_setpoint}$ will then be decreased on the following conditions:

the present setpoint value of the direct current link voltage $U_{DCW\_setpoint}$ is above the threshold $U_{DCW\_threshold}$ the rise in the specified draw current $I_{spec}$ specified by the direct current source G (for example by a fuel cell controller) is greater than 25% of the present draw current $I_{setpoint}$ plus a safety value $S_H$. The present draw current $I_{setpoint}$ is therein the value that is presently specified in the current controller of the step-up device H as the setpoint value and which is corrected to the specified draw current $I_{spec}$ with a specified dynamic (for example 10 A/s up to a power range of 2,200 W and 3.3 A/s above a power range of 2,200 W). The measured present draw current value is $I_{DCH}$, corresponding to the setpoint value $I_{setpoint}$ in the controller. The safety value $S_H$ takes account of operating conditions having low current values in which comparing the differential values as a percentage would cause the controller to respond too late. The safety value $S_H$ is in the order of 1.2% of the maximum possible draw current of the direct current source G (the maximum possible draw current of the direct current source G is around 100 A in the case of the characteristic curve of a simulated fuel cell shown in FIG. 4; the safety value $S_H$ will then be around 1.2 A)

the present draw current $I_{setpoint}$ is smaller than the maximum draw current $I_{setpoint\_max}$ by a safety value $S_{12}$. The maximum draw current $I_{setpoint\_max}$ is therein dependent on the present voltage $U_{DCH}$ of the direct current source G and is specified as the internal current limitation of the direct current source G. An exemplary curve of the maximum draw current $I_{setpoint\_max}$ is shown in FIG. 3 for a fuel cell. $I_{setpoint\_max}$ is zero up to a fuel cell voltage $U_{DCH}$ of approximately 26V; it then rises sharply up to a fuel cell voltage $U_{DCH}$ of approximately 29V to around 81 A to then drop again to zero almost continuously up to a fuel cell voltage $U_{DCH}$ of approximately 63V. The effect of the safety value $S_{12}$ is that the setpoint value of the direct current link voltage $U_{DCW\_setpoint}$ will drop before the internal current limitation of the direct current source G has been reached. The safety value $S_{12}$ can be assumed as being 2.5% of the highest maximum current setpoint value $I_{setpoint\_max}$, around 2.1 A in the exemplary case.

The voltage is accordingly decreased in keeping with the following conditions:

$U_{DCW}>U_{DCW\_threshold}$ and $I_{spec}>1.25*I_{setpoint}S_{11}$ and $I_{setpoint}<I_{setpoint\_max}-S_{12}$ \qquad (2)

The voltage is decreased according to the following formula:

$$U_{DCW\_setpoint}=(U_{DCH}*N-S_U)*0.9 \quad (3)$$

The voltage will thereafter not be raised again until the value of the draw current $I_{setpoint}$ reaches the value of the specified draw current $I_{spec}$. It is then raised according to the following steps:

The following applies for at least 1.5 seconds:

$$U_{DCW}<(U_{DCH}*N-S_U)*0.9+25V \quad (4)$$

The direct current link voltage value $U_{DCW\_setpoint}$ will then be raised to 94%:

$$U_{DCW\_setpoint}=(U_{DCH}*N-S_U)*0.94 \quad (5)$$

The following applies for at least 1.5 seconds:

$$U_{DCW}<(U_{DCH}*N-S_U)*0.94+25V \quad (6)$$

The direct current link voltage value $U_{DCW\_setpoint}$ will then be raised to 98%:

$$U_{DCW_p\_setpoint}=(U_{DCH}*N-S_U)*0.98 \quad (7)$$

The following applies for at least 1.5 seconds:

$$U_{DCW}<(U_{DCH}*N-S_U)*0.98+25\ V \quad (8)$$

The direct current link voltage value $U_{DCW\_setpoint}$ will then be raised to 100% and formula (1) will again apply. If the condition (2) is fulfilled within steps (4) to (8), a return will be made to step (3).

The invention claimed is:

1. A method for operating an inverter having a step-up device, wherein the inverter and step-up device each have their own efficiency-optimized operating range, comprising:
   connecting a direct current source by a direct current link to the step-up device, wherein the direct current source has a varying specified draw current;
   providing a direct current link voltage by the step-up device;
   decreasing the direct current link voltage of the step-up device when the specified draw current of the direct current source rises and the step-up device approaches a maximum value of a pulse duty factor; and
   raising the direct current link voltage of the step-up device upon stabilizing of the specified draw current,
   wherein an input voltage of the step-up device times a transformation ratio of the step-up device minus a safety value of approximately 30% of a mean input voltage range value of the inverter is specified as an optimum direct current link voltage and an uppermost and lowermost input voltage range value of the inverter are specified respectively as an upper limiting value and a lower limiting value of the direct current link voltage, and
   wherein
   the direct current link voltage is decreased by approximately 90% of a present value if the following conditions are met:
   the present value of the direct current link voltage exceeds a threshold of approximately 90% of the upper voltage limiting value of the efficiency-optimized operating range of the inverter, and
   the specified draw current of the direct current source exceeds 125% of the present draw current, and
   the present draw current is approaching the maximum draw current specified as the internal current limitation of the direct voltage source, and
   the direct current link voltage will be raised step-by-step if:
   the present value of the direct current link voltage is below the optimum direct current link voltage,
   the present draw current corresponds to the specified draw current, and
   if the aforementioned conditions for decreasing the direct current link voltage are not met.

2. An arrangement for operating an inverter, comprising:
   a direct current source that provides a direct current having a variable specified draw current;
   a step-up device connected to the direct current source that increases the direct current voltage; and
   a control unit connected to the inverter and step-up device that controls an operation of the arrangement,
   wherein a direct current link voltage of the step-up device is decreased when the specified draw current rises and the step-up device approaches a maximum value of a pulse duty factor,
   wherein the direct current link voltage of the step-up device is raised upon stabilizing the specified draw current,
   wherein the step-up device is an isolated step-up device,
   wherein the direct current source is selected from the group consisting of: a fuel cell, a photovoltaic cell, a battery, an accumulator, and a direct current generator,
   wherein the control unit controls the inverter and step-up device,
   wherein the control unit has a microprocessor,
   wherein an input voltage of the step-up device times a transformation ratio of the step-up device minus a safety value of approximately 30% of a mean input voltage range value of the inverter is specified as an optimum direct current link voltage, and
   wherein
   the direct current link voltage is decreased by approximately 90% of a present value if the following conditions have been met:
   the present value of the direct current link voltage exceeds a threshold of approximately 90% of an upper voltage limiting value of the efficiency-optimized operating range of the inverter, and
   the specified draw current of the direct current source exceeds 125% of a present draw current, and
   the present draw current approaches a maximum draw current specified as an internal current limitation of the direct voltage source, and
   the direct current link voltage is raised step-by-step if:
   the present value of the direct current link voltage is below an optimum direct current link voltage,
   the present draw current corresponds to the specified draw current, and
   if the aforementioned conditions for decreasing the direct current link voltage are not met.

* * * * *